(12) United States Patent
Kumar et al.

(10) Patent No.: US 8,856,731 B2
(45) Date of Patent: Oct. 7, 2014

(54) SCALABLE LANGUAGE INFRASTRUCTURE FOR ELECTRONIC SYSTEM LEVEL TOOLS

(75) Inventors: Rajesh Kumar, Delhi (IN); Sanjay Kumar Jain, Ghaziabad (IN)

(73) Assignee: Synopsys, Inc., Mountain View, CA (US)

(*) Notice: Subject to any disclaimer, the term of this patent is extended or adjusted under 35 U.S.C. 154(b) by 49 days.

(21) Appl. No.: 13/356,472

(22) Filed: Jan. 23, 2012

(65) Prior Publication Data

US 2013/0024839 A1    Jan. 24, 2013

Related U.S. Application Data

(63) Continuation of application No. 11/356,578, filed on Feb. 17, 2006, now Pat. No. 8,104,016.

(60) Provisional application No. 60/753,899, filed on Dec. 22, 2005.

(51) Int. Cl.
*G06F 9/44* (2006.01)
*G06F 9/45* (2006.01)

(52) U.S. Cl.
CPC .................................. *G06F 8/36* (2013.01)
USPC ............ 717/106; 717/114; 717/136; 717/139

(58) Field of Classification Search
None
See application file for complete search history.

(56) References Cited

U.S. PATENT DOCUMENTS 7,441,237 B2* 10/2008 Warren et al. ................. 717/140

OTHER PUBLICATIONS

Octavian Dragoi, "The Conceptual Architecture of the Apache Web Server", University of Waterloo, 1999.*
PCT International Search Report, PCT Application No. PCT/US2006/048069, Jun. 6, 2007, 10 pages.
PCT International Preliminary Report on Patentability, PCT Application No. PCT/US2006/048069, Jun. 24, 2008, 5 pages.

* cited by examiner

*Primary Examiner* — Lewis A Bullock, Jr.
*Assistant Examiner* — Mark Gooray
(74) *Attorney, Agent, or Firm* — Fenwick & West LLP (57) ABSTRACT

Systems and methods of scalable language infrastructure for electronic system level tools. In accordance with embodiments of the present invention, knowledge about types, functions and the like is encapsulated in a plurality of intelligent components called active component extension modules that are external to the infrastructure. The infrastructure implements a communication mechanism between the clients and these intelligent components, and acts as a common backbone. The infrastructure itself does not maintain any knowledge about any client, types, functions, etc. In accordance with a method embodiment of the present invention, a request is received from a client of a language infrastructure. The request is forwarded from the language infrastructure to an active component extension module. The active component extension module performs a service responsive to the request.

19 Claims, 4 Drawing Sheets

SCALABLE LANGUAGE INFRASTRUCTURE FOR ELECTRONIC SYSTEM LEVEL TOOLS

RELATED APPLICATIONS

This application is a Continuation of commonly-owned U.S. patent application Ser. No. 11/356,578, now U.S. Pat. No. 8,104,016, filed Feb. 18, 2006, which in turn claimed benefit of U.S. Provisional Patent Application Ser. No. 60/753,899, filed Dec. 22, 2005, entitled "Scalable Language Infrastructure for Electronic System Level Tools" to Kumar and Jain. All such applications are hereby incorporated herein by reference in their entireties.

BACKGROUND OF THE INVENTION

1. Field of the Invention

The present invention relates to electronic system level (ESL) tools for the design of electronic systems.

2. Related Art

A conventional electronic system level (ESL) tool is typically tailored, e.g., hard coded, to meet the requirements of its clients. This makes it difficult to extend the capabilities of the tool in order to support new clients and/or client requirements if such requirements were not designed for during the initial design of the tool. Unfortunately, one or more new infrastructures generally are required to be created to accommodate such new client requirements. As an undesirable consequence of creating such new infrastructures, frequently two or more language infrastructures must be created to handle a variety of clients. Such multiple language infrastructures typically duplicate many types and functions. Thus, much of the effort expended in creating such additional language infrastructures is deleteriously duplicative and wasteful.

Figure 1:
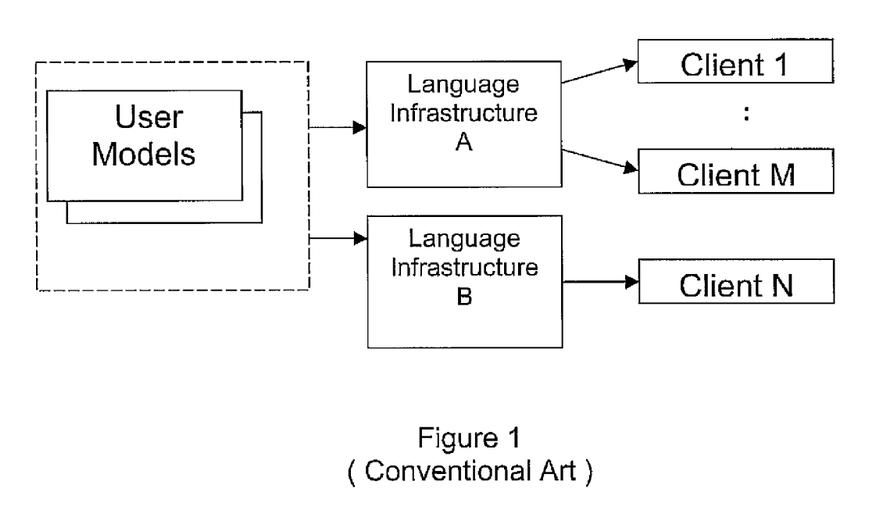
FIG. 1 is a conventional art use of multiple language infrastructures.

A conventional art approach is shown in FIG. 1 (conventional art). The language infrastructures provide common operations such as parsing, managing an intermediate representation, evaluation, etc. Typically, there is a type system sub module to handle the types and functions supported by the tool.

Each language infrastructure is tailored to meet the requirements of its clients. Thus, it is difficult to support new flows with an existing language infrastructure if such a flow was not accommodated during the design of the language infrastructure. Consequently, a new language infrastructure must be created to support such new flows. Hence, as the tool evolves and new flows are added, often a multiplicity of language infrastructures are created to support such flows.

A language infrastructure designed to support C code generation is used as an example. This client needs to generate appropriate code for the user models. While the processing for standard C++ constructs is straightforward, the client would generally need support from the infrastructure to handle the types and functions. As the client processes an expression, depending on the type of operands used, it will find out from the language infrastructure the optimum code to be generated. The language infrastructure will maintain the necessary information about the types to be able to provide this support. If this tool is extended to support a hardware design language (HDL) generation flow as well, it may require very different information to be kept about the types, and it may not be possible to extend the previous language infrastructure in order to provide efficient support to both flows. As a result, the only resort under the conventional art is to create a new, separate language infrastructure for the new flow.

Under the conventional art, a language infrastructure does not scale well as the number of new flows increases, and a new language infrastructure is generally required for such new flows. The creation of new language infrastructures consumes resources and is very duplicative, as many of the functions of a language infrastructure are common to most or all implementations.

In addition, each different infrastructure generally maintains its own copy of the information about types and functions in its own way. Such multiple copies are frequently incompatible and it is generally difficult to maintain synchronization among such multiple copies.

Further, a conventional art language infrastructure generally provides limited flexibility in supporting types and functions. More particularly, it is rare for a conventional art language infrastructure to support user defined types and functions.

Conventional art language infrastructures are currently utilized in many tools. However, they are particularly poorly suited to the field of electronic system level (ESL) tools, as the common use of ESL tools is characterized by rapidly evolving flows.

SUMMARY OF THE INVENTION

Accordingly, systems and methods of scalable language infrastructure for electronic system level tools are needed. In addition, systems and methods of scalable language infrastructure for electronic system level tools that enable support of a variety of clients would be advantageous. Further, systems and methods of scalable language infrastructure for electronic system level tools that scale up well and are flexible enough to satisfy the needs of evolving design flows are highly desired.

Systems and methods of scalable language infrastructure for electronic system level tools are disclosed. In accordance with embodiments of the present invention, knowledge about types, functions and the like is encapsulated in a plurality of intelligent components called active component extension modules that are external to the infrastructure. The infrastructure implements a communication mechanism between the clients and these intelligent components, and acts as a common backbone. It is appreciated that the infrastructure is scalable as it does not maintain any knowledge itself about any client, types, functions, etc.

In accordance with a method embodiment of the present invention, a request is received from a client of a language infrastructure. The request is forwarded from the language infrastructure to an active component extension module. The active component extension module performs a service responsive to the request.

In accordance with another embodiment of the present invention, a computer usable media includes a language infrastructure coupled to a library of intelligent components. The intelligent components maintain the specific knowledge about types, functions, etc., and respond to a client request made to the language infrastructure.

Major advantages of the present invention are afforded by its extensive scalability. For example, a single scalable language infrastructure can support all clients, eliminating the duplication of conventional language infrastructures under the conventional art. New flows can be added easily and embodiments of the present invention scale very will with the number of increasing clients. Even clients that require new processing capabilities can be easily supported without the need of a new language infrastructure. There is a great deal of flexibility is the support for types, functions and the like. New types can be added easily with no limitation be imposed by existing types. It is straightforward to add or extend the behavior of the types. Since a single scalable language infrastructure supports all clients, such new type behavior is beneficially reflected in all flows.

In addition, only a single copy of information related to types and functions is maintained; consequently, deleterious synchronization issues present under the conventional art are overcome. Further, embodiments in accordance with the present invention support advanced language features such as templates.

BRIEF DESCRIPTION OF THE DRAWINGS

The accompanying drawings, which are incorporated in and form a part of this specification, illustrate embodiments of the present invention and, together with the description, serve to explain the principles of the invention. The drawings referred to in this description should not be understood as being drawn to scale except if specifically noted.

DETAILED DESCRIPTION OF THE INVENTION

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Notation and Nomenclature

Some portions of the detailed descriptions that follow (e.g., process 300) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "requesting" or "performing" or "querying" or "sending" or "accessing" or "commanding" or "storing" or "dividing" or "computing" or "testing" or "calculating" or "determining" or "measuring" or "adjusting" or "generating" or "comparing" or "synchronizing" or "accessing" or "retrieving" or "conveying" or "resuming" or "installing" or "gathering" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Scalable Language Infrastructure for Electronic System Level Tools

A language infrastructure for an electronic system level tool, generally, comprises a set of software services for the support of a computer language, typically a programming language used to model an electronic system. For example, a language infrastructure may contain a language parser, an evaluation engine, a code generator and data structures to store an abstract syntax tree (AST). For example, in an exemplary case of the C++ language being used to model the system, a C++ language infrastructure may access a C++ construct, e.g., an expression, a statement or a complete C++ file. A C++ language infrastructure may then parse the accessed content. A C++ language infrastructure may generally produce an abstract syntax tree (AST), representing the entire syntax structure that has been parsed. An AST is generally a standardized data structure in the form of a graph or a tree.

In general, a plurality of client software may access an abstract syntax tree (AST) created by a language infrastructure to perform operations characteristic of the client. For example, one of the clients of a C++ language infrastructure in an electronic system level tool is an interpretive analysis flow. This flow may access an AST in the process of executing the C++ statements interactively.

Under the conventional art, a language infrastructure generally contains all of the services that a particular client may require. For example, a language infrastructure and a client are closely paired. For example, a conventional language infrastructure comprises all of the types, e.g., data types, and functions that the language supports. Frequently, the pairing is so tight that a client/infrastructure are supplied and utilized as a single, indivisible whole.

Figure 2:
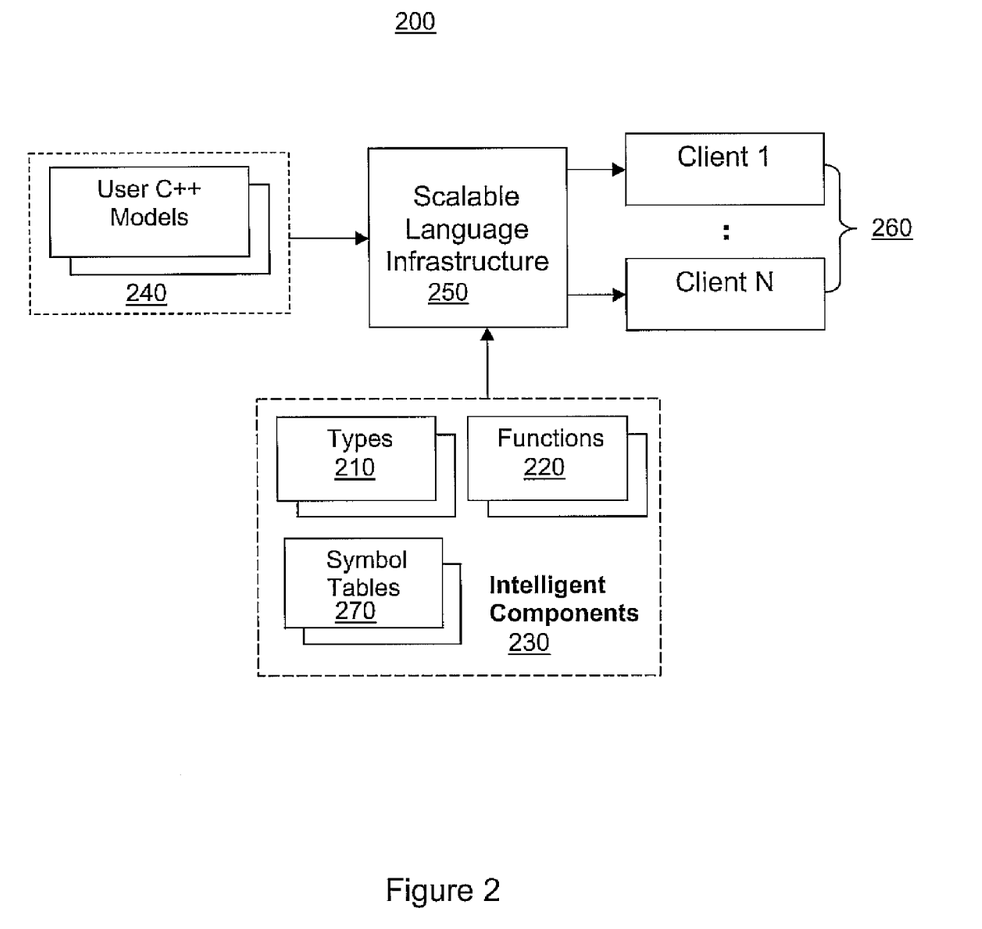
FIG. 2 illustrates a block diagram of a scalable language infrastructure system for electronic system level tools, in accordance with an embodiment of the present invention.

FIG. 2 illustrates a block diagram of a scalable language infrastructure system 200 for electronic system level tools, in accordance with an embodiment of the present invention. The C++ language and associated terminology is utilized herein to illustrate embodiments of the present invention. However, it is to be appreciated that embodiments in accordance with the present invention are well suited to other object-oriented environments and not limited to C++.

In accordance with embodiments of the present invention, knowledge or information about types 210, functions 220 and the like is encapsulated in a plurality of intelligent components 230. The infrastructure implements a communication mechanism between the clients and these intelligent components, which acts as a common backbone. It is appreciated that the infrastructure itself does not maintain any knowledge about any client, types, functions, etc.

For example, every type supported will have an intelligent component that corresponds to that type. Similarly, there will be an intelligent component corresponding to every function. Any client doing some processing of a type will interact with its intelligent component, which will carry out the processing for that client. When a new type or function is to be added, an intelligent component will be created for it. When the behavior of a type of function is to be changed, changes will be required only in its corresponding intelligent component.

Plurality of models 240 model system descriptions, e.g., transmitters, receivers, filters and the like, and may be characterized in C++ language modeling, for example, using C++ and/or "System C" to specify the behavior.

A plurality of clients 260 is serviced by the scalable language infrastructure 250. Examples of clients include interpretive analysis, expression evaluation, code generation, synthesis, generation of hardware description language (HDL) and/or estimation.

Scalable language infrastructure 250 parses the input models 240, performs a semantic check, evaluates expressions and/or performs some code generation, e.g., for expressions.

Scalable language infrastructure 250 parses user input 240. For example, a user model may comprise "sin(x)" wherein "sin" is a function call that a user model is trying to meet. At that point scalable language infrastructure searches for the name "sin." Once parsing is done, model 240 is handed to a client. The client attempts to perform the operation relevant to the model. For example, if a client is to evaluate the expression "sin(x)," the client inquires of the scalable language infrastructure for an application programming interface to execute this function labeled "sin." This lookup operation may be performed by a context lookup interface of the scalable language infrastructure, described further below.

Alternatively, a different client may not desire to evaluate the function, but rather desires efficient software code to evaluate the "sin" function for a particular environment. In this case, the client enquires from the scalable language infrastructure for an application programming interface that can provide such software code.

If a future client is added, for example, that desires to estimate performance of the execution of the "sin" function, such new client will enquire from the scalable language infrastructure for an application programming interface that can provide such an estimate.

New clients, e.g., new flows, can be added in a straightforward manner without a substantial change if they use the existing capabilities supported by the components. If the flow requires a new capability, e.g., performing software estimation, this would need to be added to just those intelligent components that would be supported by this flow. This does not require any change in the infrastructure at all, since the intelligent components are in a library external to the infrastructure.

In accordance with an embodiment of the present invention, the clients do not need to know in advance what capabilities are supported by a component, as they can dynamically determine such support by querying the components themselves. This approach is advantageously open, supporting extendibility in a straightforward manner.

An active component extension (ACE) is used to build the intelligent components. The active component extension library (ACE-library) is a dynamically linked library, e.g., a DLL, that contains non-core components of a scalable language infrastructure, for example, data-types, functions, constants, symbol tables, e.g., symbol tables 270, and the like. An ACE-library comprises one or more active component extension modules. For example, the C++ data type "int" is implemented as an active component extension module inside an active component extension-library "builtInTypes.dll." An active component extension module implements and can be queried for one or more active component extension-interfaces (C++ application programming interfaces [APIs]) using unique identifiers known as active component extension-interface-ids.

An active component extension-interface comprises a set of functions that are already known to, and are agreed between an active component extension module and it user (calling function). For example, the active component extension module "int" data-type implements a data-type-interface called by an active component extension-interface, which can be used by the scaleable language infrastructure evaluation engine to perform functions. Exemplary functions include determining a byte-size of "int" type, allocate, de-allocate, create and/or destroy an "int" variable, and/or access active component extension modules of data-types derived from "int," e.g., "pointer-to-int."

A context lookup interface is used to perform symbol table lookup and access active component extension module for a named entity, for example a variable or a data-type referred to in a C++ expression. This interface is also used to add a symbol, e.g., a named entity, to the symbol table. For example, in response to execution of a declaration statement, a variable name should be added to the symbol table. In this exemplary case, the calling function provides all of the necessary details which are to be stored in the symbol table for the new name. For example, in the case of a variable, an active component extension module of its data-type and pointer to the memory where the value of the variable is maintained is stored.

For example, under the conventional art, a variable "A" is generally described in a fixed data structure. In accordance with embodiments of the present invention, the variable "A" is implemented as an active component extension (ACE). In response to a client inquiring about the variable "A" via a scalable language infrastructure, the client is provided with the corresponding active component extension module. The client may then interact with the active component extension module to determine information about the variable "A," for example, its data-type and/or current value. It is appreciated that each different type of characteristic is supported by a different active component extension module.

For example, a client may inquire as to the number of significant digits in the value of variable "A." If this inquiry is not supported by a conventional language infrastructure, typically the language infrastructure must be modified to support such a request.

Advantageously, in accordance with embodiments of the present invention, a client request for a new support may be satisfied via an active component extension to service the request, without modification of the scalable language infrastructure itself.

Implementing symbol lookup using active component extension module and active component extension-interface enables highly desirable flexibility to the clients of scalable language infrastructure. When calling parse/evaluate routines in scalable language infrastructure, the client passes a context-lookup-interface to scalable language infrastructure on which it has full control. For example, this lookup function may be implemented on top of, and as part of, a client's data structure. In this manner, unnecessary duplication of information and possible sync-up complications may be avoided. Such sync-up issues can arise when the data is duplicated in the client as well as in the infrastructure, as is the case under many conventional art implementations.

In accordance with embodiments of the present invention, all data-types, functions and operators should be implemented in a uniform manner, e.g., as active component extension modules. Examples include built-in types and operations, e.g., "int" and "integer arithmetic," C++ standard library types and functions, e.g., "file *," "sin," "printf" and the like, and user-defined types and functions, e.g., "myStruct," "myFunc," and/or "my/Class." Such active component extension modules provide specific active component extension-interfaces to support various operations such as executing a function, generating C-code, accessing a particular field of a struct(ure) and so forth.

In accordance with embodiments of the present invention, implementing types and functions as active component extension modules enables powerful function and flexibility, as such types and/or functions are imported into scalable language infrastructure as active modules rather than as possible data being operated on by scalable language infrastructure routines. Such types and/or functions are able to exert full control on the level of functionality that they deliver. For example, an active component extension module of a function can be configured to provide the active component extension-interface to execute the function unlicensed, while it might require the user to buy a license to provide access to its C-code generating interface. Similarly, if it is desired to write a data-type for use in hardware description language (HDL) generation only, e.g., without generating C-code, this is possible. Further, the same data-type can also be used in conjunction with other data-types that support both HDL generation as well as C-code generation.

This approach further enables support of parameterized data-types and functions, e.g., C++ templates, in scalable language infrastructure. In a context-lookup interface, in response to looking up a parameterized data-type or function, the calling routine also sends the evaluated parameter values together with the name being looked up. For example, for a data-type "sc_int<12>," both the name "sc_int" as well as the parameter value "12" are passed. The active component extension module accessed in this example can easily support all of the operations of data-type "sc_int" specialized for parameter value "12." Under the conventional art, a creator of conventional art template of data-type "sc_int" would generally have to release such a conventional art template in source code form. In contrast, in accordance with embodiments of the present invention, the active component extension module of "sc_int" is in compiled form which can generate efficient code for a given parameter value without revealing is generic source code.

In accordance with embodiments of the present invention, a pre-compiled header is an active component extension module whose context-lookup interface can be used to access named symbols of a C++ header file. For example, an active component extension-library "math.h.dll" contains active component extension module "math.h" whose context-lookup interface can be queried to get active component extension module of function "double sin (double)."

Scalable language infrastructure provides a built-in active component extension module called scalable language infrastructure-simple-context that allows a user to collect several pre-complied headers, e.g., their active component extension modules, in a single context. Clients of scalable language infrastructure use scalable language infrastructure-simple-context to collect a set of system headers whose function they want to make available in the expression they are parsing. This is similar to the operation "#include" for several C++ header files in a C++ compile unit, e.g., a source file.

Scalable language infrastructure-directory-module is another active component extension module within scalable language infrastructure. Scalable language infrastructure-directory-module may be used to collect several pre-complied headers, e.g., their active component extension modules. In contrast to scalable language infrastructure-simple-context, however, scalable language infrastructure-directory presents such headers as different file elements in a virtual directory structure. This module can be advantageous when a user is searching for a particular pre-compiled header. For example, a scripting engine built on top of scalable language infrastructure could use this module when it parses a #include <file1.h>" statement if it needs to locate pre-compiled header for "file1.h." Providing several pre-compiled headers through a single collection in scalable language infrastructure-directory module is much more efficient than providing them as separate active component extension-libraries of their own.

Figure 3:
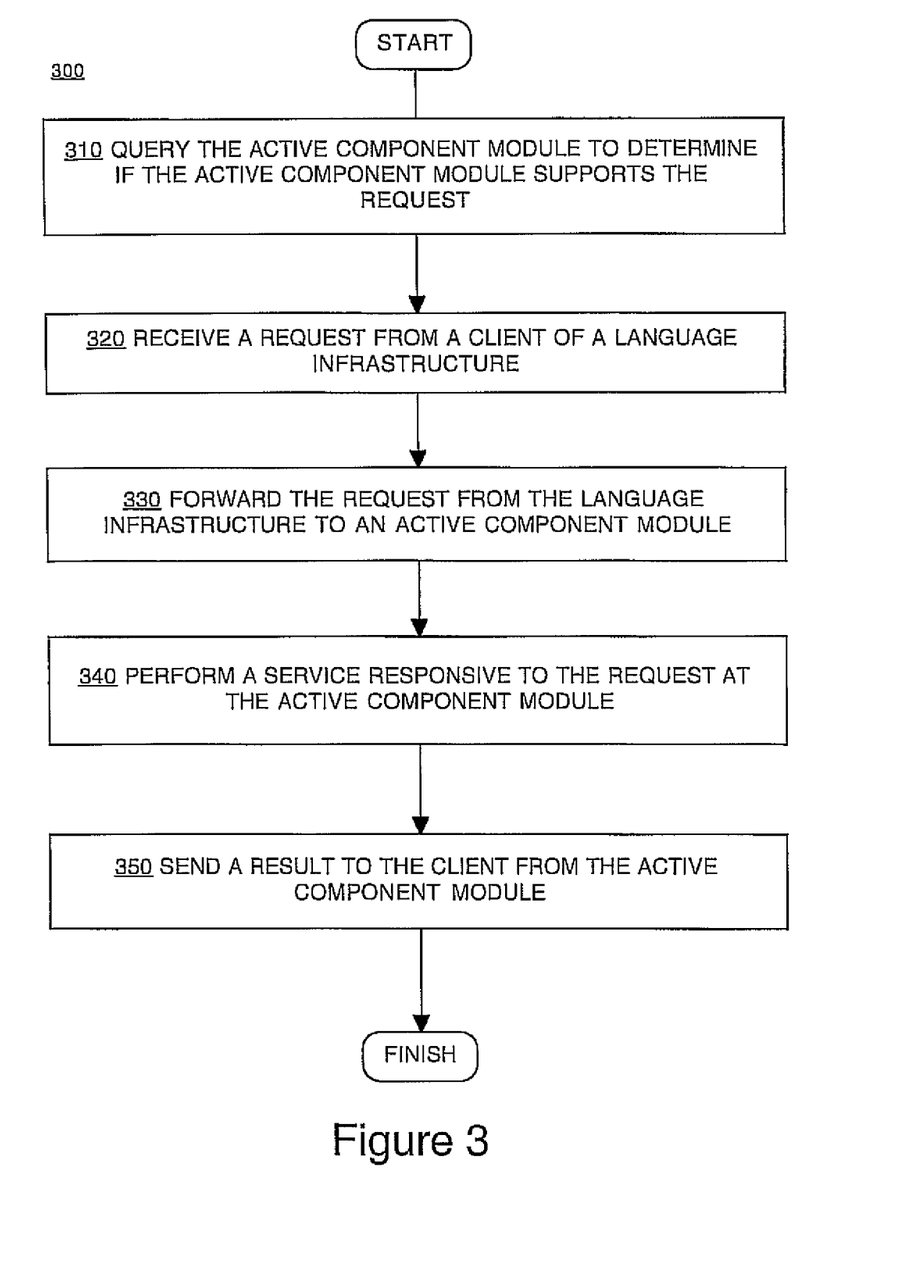
FIG. 3 is a flow chart of a method, in accordance with embodiments of the present invention.

FIG. 3 is a flow chart of a computer implemented method 300, in accordance with embodiments of the present invention. In 320, a request from a client of a language infrastructure is received. For example, with reference to FIG. 2, a client from among clients 260 sends a request to scalable language infrastructure 250. The request may be to provide a service, e.g., output to a file, or the request may be for information on a data type, e.g., a request for the value of a variable, or size of the type.

In 330, the request from the language infrastructure is forwarded to an active component extension module. For example, with reference to FIG. 2, the request is forwarded from scalable language infrastructure 250 to intelligent components 230.

In 340, a service responsive to the request is performed at the active component extension module. For example, with reference to FIG. 2, a module within intelligent components 230 performs the requested service. It is appreciated that performing the service may or may not involve a response to the client requesting the service.

In optional 350, the active component extension module sends a result to the client. For example, with reference to FIG. 2, a module within intelligent components 230 sends a result to the requesting client. The result may, for example, comprise the requested information of a data type, or the result may indicate the success or failure of another type of requested action.

In optional 310, said active component extension module is queried to determine if the active component extension module supports the request. For example, with reference to FIG. 2, a client may ask intelligent components 230 if an active component extension module supports the client's request. In this manner, a plurality of clients may build a list of data types and functions that are supported.

Figure 4:
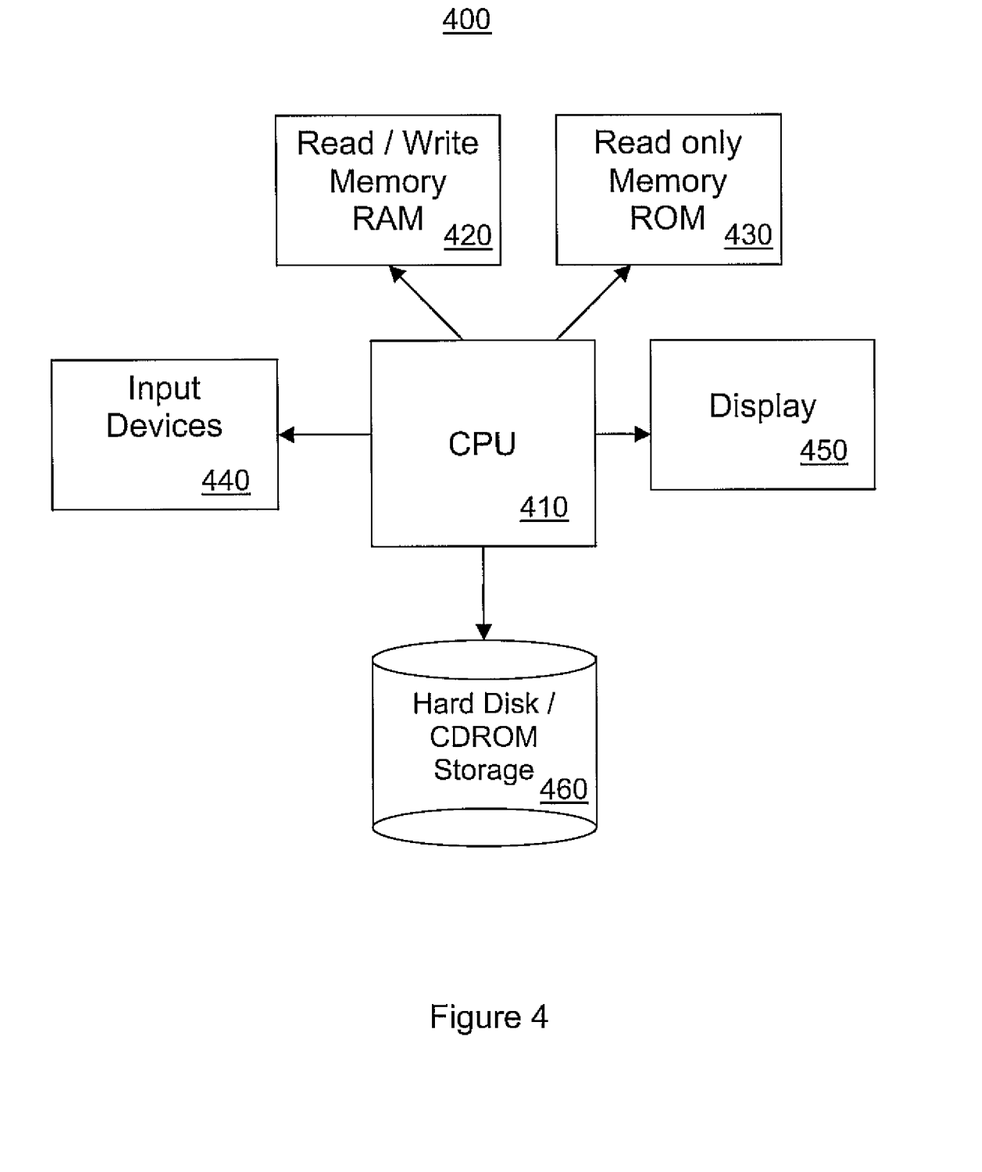
FIG. 4 is a block diagram of an exemplary computer system, which may be used as a platform to implement embodiments of the present invention.

With reference to FIG. 4 (below), some embodiments in accordance with the present invention comprise computer-readable and computer-executable instructions that reside on computer usable media, for example, in computer system 400. It is appreciated that computer system 400 of FIG. 4 is exemplary only, and that embodiments in accordance with the present invention can operate within a number of different computer systems, including general-purpose computer systems, laptop computer systems, hand-held computer systems, networked computer systems and the like.

FIG. 4 is a block diagram of an exemplary computer system 400, which may be used as a platform to implement embodiments of the present invention. Computer system 400 has a central processor unit (CPU) 410, a volatile memory 420 which can be read or written, e.g., random access memory, (RAM), for storing information and instructions for the central processor 410 and a non-volatile memory 430, e.g., read only memory (ROM), for storing static information and instructions for the processor 410. Computer system 400 may also include data storage device 460, for example, a magnetic hard disk drive and/or an optical CD/DVD drive for storing vast amounts of data.

Also included in computer system 400 of FIG. 4 are input devices 440. Input devices 440 can communicate information and command selections to the central processor 410. Examples of input devices 440 include alphanumeric keyboards and/or a mouse.

The display unit 450 utilized with the computer system 400 is used for creating graphic images and alphanumeric characters recognizable to a user of computer system 400. Example display devices include liquid crystal display (LCD) devices, cathode ray tube (CRT) devices, and the like.

In summary, embodiments of the present invention provide systems and methods of scalable language infrastructure for electronic system level tools. In addition, systems and methods of scalable language infrastructure for electronic system level tools are provided that enable support of a variety of clients. Further, systems and methods of scalable language infrastructure for electronic system level tools are provided that scale up well and are flexible enough to satisfy the needs of evolving design flows.

Embodiments in accordance with the present invention are thus described. While the present invention has been described in particular embodiments, it should be appreciated that the present invention should not be construed as limited by such embodiments, but rather construed according to the below claims.

What is claimed is:

1. An electronic system level tool system comprising:
   a processor; and
   a scalable language infrastructure executable by said processor and configured to:
   receive an input model, the input model comprising an expression,
   parse the input model and associate one or more intelligent components with the expression, the intelligent components being external to the scalable language infrastructure,
   forward the parsed input model to a plurality of clients,
   receive a request from one of the plurality of clients inquiring about the expression in the model,
   identify to the client of the plurality of clients an intelligent component of the plurality of intelligent components associated with the expression in response to the client inquiring about the expression, and
   provide the identified intelligent component to the client, wherein the intelligent component will perform a function for the expression.

2. The electronic system level tool system of claim 1 wherein the expression comprises a data structure type, function or symbol, and said scalable language infrastructure allows new data structure types or functions to be invoked or added to said scalable language infrastructure transparent to said scalable language infrastructure.

3. The electronic system level tool system of claim 1 wherein said scalable language infrastructure is coupled to a library, the library comprising the plurality of intelligent components, and wherein said library is external to said scalable language infrastructure.

4. A method for use in a scalable language infrastructure for an electronic system level tool, said method comprising:
   receiving an input model, the input model comprising an expression,
   parsing the input model and associate one or more intelligent components with the expression, the intelligent components being external to the scalable language infrastructure,
   forwarding the parsed input model to a plurality of clients,
   receiving a request from one of the plurality of clients inquiring about the expression in the model;
   identifying to the client of the plurality of clients an intelligent component of the plurality of intelligent components associated with the expression in response to the client inquiring about the expression; and
   providing the identified intelligent component to the client, wherein the intelligent component will perform a function for the expression.

5. The method of claim 4 further comprising querying the identified intelligent component if the intelligent component supports the inquiry by the client about the expression.

6. The method of claim 4 further comprising sending a result of the inquiry by the client about the expression from the intelligent component to the client.

7. The method of claim 4 wherein said language infrastructure is substantially compliant with C++ language infrastructure.

8. An article of manufacture including a non-transitory computer-readable storage medium, said non-transitory computer-readable storage medium comprising a scalable language infrastructure that is configured to:
   receive an input model, the input model comprising an expression,
   parse the input model and associate one or more intelligent components with the expression, the intelligent components being external to the scalable language infrastructure,
   forward the parsed input model to a plurality of clients,
   receive a request from one of the plurality of clients inquiring about the expression in the model;
   identify to the client of the plurality of clients an intelligent component of the plurality of intelligent components associated with the expression in response to the client inquiring about the expression; and
   provide the identified intelligent component to the client, wherein the intelligent component will perform a function for the expression.

9. The article of manufacture of claim 8 wherein the scalable language infrastructure is coupled to a library, the library comprising the plurality of intelligent components, and wherein the library is external to the scalable language infrastructure.

10. The article of manufacture of claim 8 wherein intelligent components comprise information of data structure types.

11. The article of manufacture of claim 8 wherein intelligent components comprise information of functions.

12. The article of manufacture of claim 8 wherein intelligent components comprise information of symbol tables.

13. The article of manufacture of claim 8 wherein said client inquiry comprises a request for information of a data structure.

14. The article of manufacture of claim 8 wherein said client inquiry comprises a request for a service.

15. The article of manufacture of claim 14 wherein said service comprises output to a file.

16. An article of manufacture including a non-transitory computer-readable storage medium, said non-transitory computer-readable storage medium comprising computer usable instructions that when executed perform operations comprising:

receiving an input model for a plurality of client of a scalable language infrastructure, the input model comprising an expression;

parsing the input model and associate one or more intelligent components with the expression, the intelligent components being external to the scalable language infrastructure;

forwarding the parsed input model to the plurality of clients;

receiving a request from one of the plurality of clients inquiring about the expression in the model;

identifying to the client of the plurality of clients an intelligent component of the plurality of intelligent components associated with the expression responsive to the client inquiring about the expression; and providing the identified intelligent component to the client, wherein the intelligent component will perform a function for the expression.

17. The article of manufacture of claim 16 wherein said method further comprises querying the identified intelligent components, if the intelligent component supports the inquiry by the client about the expression.

18. The article of manufacture of claim 17 wherein said method further comprises sending a result of the inquiry by the client about the expression from the intelligent component to the client.

19. The article of manufacture of claim 16 wherein the scalable language infrastructure is a substantially compliant C++ language infrastructure.

* * * * *